United States Patent [19]

Tamazaki et al.

[11] Patent Number: 5,783,296
[45] Date of Patent: Jul. 21, 1998

[54] MAGNETIC RECORDING MEDIUM

[75] Inventors: Kazunori Tamazaki; Shigeharu Watase, both of Saku; Osamu Inoue, Komoro, all of Japan

[73] Assignee: TDK Corporation, Tokyo, Japan

[21] Appl. No.: 835,022

[22] Filed: Mar. 27, 1997

[30] Foreign Application Priority Data

Mar. 29, 1996 [JP] Japan ................................ 8-103440

[51] Int. Cl.$^6$ ................................................ G11B 5/704
[52] U.S. Cl. ...................... 428/216; 428/328; 428/474.4; 428/694 BB; 428/694 SG; 428/900
[58] Field of Search ............................. 428/216, 328, 428/474.4, 694 BB, 694 SG, 900

[56] References Cited

U.S. PATENT DOCUMENTS 4,917,959  4/1990  Kasanuki ............................ 428/458

*Primary Examiner*—Stevan A. Resan
*Attorney, Agent, or Firm*—Oblon, Spivak, McClelland, Maier & Neustadt, P.C.

[57] ABSTRACT

This invention concerns a magnetic recording medium which comprises a nonmagnetic support, a magnetic layer provided on one surface of the nonmagnetic support and a backcoat layer provided on the other surface of the nonmagnetic support, wherein the nonmagnetic support is provided with such physical properties as Young's moduluses in the longitudinal direction and the lateral direction thereof in the range of 1300–1600 kg/cm$^2$, respectively, and a breaking elongation in the range of 3–10% and said magnetic recording medium is provided on the magnetic layer side thereof with a convex cupping the magnitude of which is in the range of 0.02–0.20 mm at a width of 3.8 mm.

The magnetic recording medium, therefore, realizes perfect head touch even when the thickness of the nonmagnetic support and the thickness of the whole medium are small. Even when the magnetic recording medium is exposed to the mechanical influences and physical influences of aging, it suffers extremely small change in the form (such as, for example, the cupping value) and therefore conserves the head touch and other factors in highly satisfactory state. It suffers occurrence of dropout or head stain only sparingly.

5 Claims, 1 Drawing Sheet

MAGNETIC RECORDING MEDIUM

BACKGROUND OF THE INVENTION

1. Field of the Invention

This invention relates to a magnetic recording medium which is provided on a nonmagnetic support thereof with a magnetic layer and a backcoat layer, and more particularly to a magnetic recording medium which is provided with a prescribed cupping value being set to improve head touch and to decrease dropout and head stain, enabled to diminish the influence of a change of the cupping value by aging even when the thickness of the nonmagnetic support and the thickness of the whole medium are small, and allowed to conserve such factors as head touch in a good state for a long time.

2. Description of the Prior Art

For the sake of accomplishing high densification of magnetic recording, it is advantageous to decrease the thickness of the magnetic recording medium (particularly of the magnetic layer) to the fullest possible extent. If the magnetic recording medium loses thickness, however, the recording system particularly of the rotary head type will tend to incur impaired head touch between the medium and the head.

For the purpose of enabling the recording system of the rotary head type to preclude the problem of this nature and attain improved head touch, it is necessary to design a magnetic recording medium which particularly befits the recording system. It is, therefore, thought fit to review the mechanical strength of the medium or to review the specific form (such as, for example, the so-called cupping rate or degree) of the medium. The cupping of the magnetic recording medium in particular has a profound effect, good or bad, on the head touch.

Generally, it becomes increasingly difficult to set perfect specifications of the medium for improving head touch in proportion as the thickness of the nonmagnetic support is decreased in concert with the decrease of the thickness of the whole magnetic recording medium. It has been held that even when such perfect specifications of the medium are set somehow for improving head touch, it is still difficult to keep the head touch in a perfect state continuously during a long time use of the system. This is because the magnetic recording medium (particularly the nonmagnetic support thereof) tends to suffer alteration of the form thereof along the course of time under mechanical influences and physical influences due to the small thickness of the medium.

As concrete examples of the conventional technique regarding the cupping of the medium, the inventions disclosed in JP-A-59-121,628 and JP-A-63-39,132 may be cited.

The published specification of JP-A-59-121,628 discloses a method which comprises preliminarily imparting to a nonmagnetic support a cupping in an opposite direction in anticipation of and in compensation for the amount of cupping which will arise when the nonmagnetic support is coated with a thin ferromagnetic metal film. This method can be expected to be effective to a certain degree when the nonmagnetic support has a relatively large thickness (in case of using a thickness of 16 μm actually embodied). If the nonmagnetic support has such a small thickness as falls in the neighborhood of 4.5 μm, for example, the magnetic recording medium obtained as a finished product will incur difficulty in attaining required control of the cupping thereof because the nonmagnetic support has a low Young's modulus.

JP-A-63-39132 has made a proposal to the effect that the regulation of cupping is accomplished by defining the ratio of modulus of elasticity between the backcoat layer and the magnetic layer. In the case of a so-called coating type magnetic recording medium, however, it is difficult to regulate the cupping solely by the balance of modulus of elasticity between the backcoat layer and the magnetic layer. It is further thought that the characteristics of the nonmagnetic support itself form an important factor.

This invention has been created in due recognition of such true state of prior art as mentioned above. It has for an object thereof the provision of a magnetic recording medium which is capable of setting a prescribed cupping value realizing to improve such properties as head touch even when the thickness of the nonmagnetic support and the thickness of the whole medium are small, offering difficulty in yielding to the effect of the alteration of the form (such as, for example, the cupping value) of the magnetic recording medium even when exposed to mechanical influences and physical influences along the course of time, and conserving head touch and other factors in a perfect state. This invention has another object of providing a magnetic recording medium which can be realized to decrease dropout or head stain.

SUMMARY OF THE INVENTION

To accomplish the objects, this invention is directed to a magnetic recording medium which comprises a magnetic layer provided on one surface of a nonmagnetic support and a backcoat layer provided on the other surface of the nonmagnetic support, the nonmagnetic support being provided with such physical properties as Young's moduluses in the longitudinal direction and the lateral direction thereof in the range of 1300–1600 kg/cm$^2$ and a breaking elongation in the range of 3–10%, respectively, and the magnetic recording medium being provided on the magnetic layer side thereof with a convex cupping the magnitude of which is in the range of 0.02–0.20 mm at a width of 3.8 mm.

In a preferred embodiment of this invention, the nonmagnetic support in a state prior to the formation of a magnetic layer and a backcoat layer thereon is provided on the side for the formation of the magnetic layer with a convex cupping the magnitude of which is in the range of 0.02–0.20 mm at a width of 3.8 mm.

In another preferred embodiment of this invention, the nonmagnetic support has a thickness in the range of 3.5–7.0 μm and the magnetic recording medium has a thickness in the range of 4.0–10.0 μm.

In still another preferred embodiment of this invention, the nonmagnetic support is formed of an aromatic polyamide.

In yet another preferred embodiment of this invention, the magnetic recording medium is used for a rotary head type recording system.

DETAILED DESCRIPTION OF THE INVENTION

Figure 1:
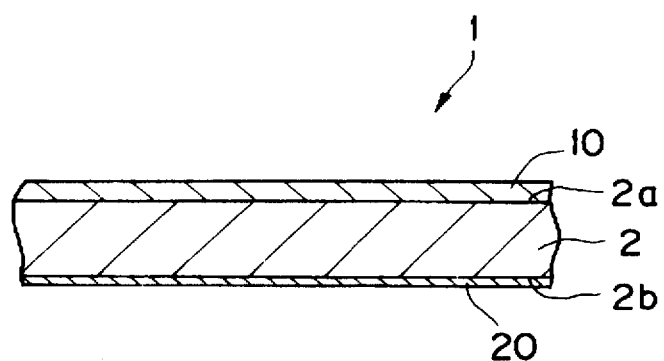
FIG. 1 is a schematic cross section illustrating one example of the magnetic recording medium of this invention.

Now, the mode of embodying the present invention will be described in detail below.

A magnetic recording medium 1 of this invention is provided, as illustrated in FIG. 1, on one surface 2a of a nonmagnetic support 2 with a magnetic layer 10 and on the other surface 2b of the nonmagnetic support 2 with a backcoat layer 20. The nonmagnetic support 2 to be used in this invention is furnished with such physical properties as Young's moduluses in the longitudinal direction and the lateral direction of the support 2 severally in the range of 1300–1600 kg/cm$^2$ and breaking elongation in the range of 3–10%.

Further, the nonmagnetic support 2 itself to be used in this invention prior to the formation of the magnetic layer 10 and the backcoat layer 20 thereon is provided on the side for the formation of the magnetic layer with a convex cupping the magnitude of which is in the range of 0.05–0.25 mm at a width of 3.8 mm. The term "cupping" as used herein refers to the phenomenon of the nonmagnetic support 2 curving not in the longitudinal direction but in the lateral direction of the nonmagnetic support 2. The quantitized degree of this cupping of the nonmagnetic support 2 is referred to as "cupping value" in this invention. Incidentally, the curve of the nonmagnetic support 2 in the longitudinal direction is generally called as "a curl (curling)."

If the Young's modulus of the nonmagnetic support 2 is less than 1300 kg/cm$^2$, it will become no longer possible to obtain fully satisfactory head touch because the magnetic recording medium has inferior rigidity owing to the trend of the magnetic medium toward loss of overall thickness. Moreover, the magnetic recording medium will attain required control of the cupping only with difficulty because it readily succumbs to the influences of such conditions for the production of the magnetic recording medium as the drying conditions to be adopted with respect to the cupping of the magnetic recording medium. The cupping value by nature varies with the elapse of time. When the Young's modulus is low, the Young's modulus of the magnetic layer predominates and the magnetic layer assumes a concave cupping and fails to produce stable head touch. In contrast, if the Young's modulus of the nonmagnetic support exceeds 1600 kg/cm$^2$, the head touch will be rather impaired because the recording medium assumes unduly high rigidity.

If the breaking elongation of the nonmagnetic support 2 is less than 3%, the production line for the magnetic recording medium will suffer from inferior productivity because the nonmagnetic support is liable to break in the production line. Conversely, if the breaking elongation of the nonmagnetic support 2 exceeds 10%, the difference in breaking elongation between the magnetic layer and the backcoat layer will widen so much as to impair the ease with which the magnetic recording medium is cut in a prescribed width.

If the cupping value of the nonmagnetic support 2 itself either falls short of 0.05 mm or exceeds 0.25 mm, the magnetic recording medium will be no longer capable of producing fully satisfactory head touch.

The terms "Young's modulus, breaking elongation, and cupping value" are used in this invention as defined in the working examples to be cited hereinafter, respectively.

A material for the nonmagnetic support 2 used in this invention, an aromatic polyamide incorporating as a filler therein an inorganic compound such as an oxide or a carbonate of Al, Ca, Si, or Ti or an organic compound such as an acrylic resin type fine powder may be cited. The nonmagnetic support 2, prior to applying of the magnetic layer, etc. thereon, may be treated by corona discharge, treated by plasma discharge and/or polymerization, treated by application of a highly adhesive agent, treated for removal of dust, or treated for alleviation by heating and/or humidity adjustment.

In this invention, it is important that the nonmagnetic support 2 itself should be provided with a cupping (value) in a prescribed range as described above. The cupping value of the nonmagnetic support 2 can be controlled, for example, by varying the drying conditions to be used for the film as a master web for the nonmagnetic support after the film has been orientated (or elongated, or stretched). To be specific, the cupping increases when the drying temperature used on the film after the orientation, is heightened (to dry the film quickly). On the other hand, the cupping decreases when the drying temperature used on the film after the orientation, is lowered (to dry the film slowly).

Besides, in this invention, it is important that the Young's modulus and the breaking elongation of the nonmagnetic support 2 should be controlled in the ranges mentioned above. The control can be adjusted by the degree of orientation. The Young's modulus tends to increase and the breaking elongation to decrease when the ratio of orientation is heightened. The Young's modulus tends to decrease and the breaking elongation to increase when the ratio of orientation is lowered.

The thickness of this nonmagnetic support 2 is set in the range of 3.5–7.0 μm, preferably 3.8–6.0 μm, with attaining the object of decreasing the layer thickness.

On this nonmagnetic support 2, the magnetic layer 10 and the backcoat layer 20 are formed as illustrated in FIG. 1. The magnetic recording medium as a finished product resulting from the formation of these layers is provided on the magnetic layer 10 side thereof with a convex cupping the magnitude of which is so set as to fall in the range of 0.02–0.20 mm at a width of 3.8 mm. If this magnitude falls short of 0.02 mm or exceeds 0.20 mm, the produced magnetic recording medium will be no longer capable of producing fully satisfactory head touch. This head touch is fully satisfactory only when the prescribed cupping value of the magnetic recording medium is matched well with the prescribed physical properties of the nonmagnetic support. The fully satisfactory head touch is obtained because the magnetic layer side of the magnetic recording medium is enabled to retain the convex state even when the cupping value is varied by aging.

Then, the magnetic layer 10 which is formed on the nonmagnetic support 2 will be described. The magnetic layer 10 generally contains a magnetic powder and a binder.

As concrete examples of the magnetic powder to be used herein, iron oxide magnetic powder, ferromagnetic metal powder, plate hexagonal ferrite, and chromium dioxide may be cited. It is particularly advantageous to use ferromagnetic metal powder or plate hexagonal ferrite among other magnetic powders mentioned above.

The materials usable for the ferromagnetic metal powder include Fe, Ni, Co, and alloys thereof, for example. When powders having as main components thereof such ferromagnetic metal elements as α-Fe, Fe-Co, Fe-Ni, Fe-Co-Ni, Co, and Co-Ni are used, they appropriately contain metals (Fe, Co, Ni, etc.) or alloys at a ratio of not less than 70% by weight, preferably not less than 75% by weight. In the case of a ferromagnetic metal powder having Fe as a main component thereof and further containing at least Co, the Co atom content is in the range of 5–40% by weight, preferably 6–35% by weight, based on the Fe atom content.

The ferromagnetic metal powder having Fe and/or Co as a main component thereof properly contains rare earth elements including Y. The ferromagnetic metal powder may have the particle surface thereof coated with an oxide film, may have the particles thereof partly carbonized or nitrided, or may have the particle surface coated with a carbonaceous film. The ferromagnetic metal power is allowed to contain a small amount of a hydroxide or an oxide. The plate hexagonal ferrite is a ferromagnetic powder of hexagonal plate crystals having an easily magnetizing axis in a direction perpendicular to the plate. As concrete examples of the plate hexagonal ferrite, Ba-ferrite, Sr-ferrite, Pb-ferrite, Ca-ferrite, and these ferrites substituted by a metal atom equal to the total valency of relevant Fe atoms, and hexagonal Co powder may be cited.

All the magnetic powders mentioned above are allowed to incorporate therein a small amount of any of such elements as Al, Si, Cr, Mn, Zn, Cu, Zr, Ti, Bi, Ag, Pt, B, C, P, N, Y, S, Sc, V, Mo, Rh, Pd, Ag, Sn, Sb, Te, Ba, Ca, Ta, W, Re, Au, Hg, Pb, La, Sr, and rare earth elements. The incorporation of Al, Si, P, Y, or rare earth element, among other elements mentioned above, is particularly effective in improving particle size distribution and preventing sintering, for example.

These magnetic powders may be coated with the film of Al, Si, or P or an oxide thereof or may be given a surface treatment with a coupling agent of Si, Al, or Ti or with a varying surfactant.

These magnetic powders are generally contained in an amount of 100–2000% by weight, based on 100% by weight of the binder. The content of the magnetic powder in the magnetic layer is in the range of 50–95% by weight, preferably 55–90% by weight. If the content of the magnetic powder is unduly large and, as a natural consequence, the amount of resin and other additives in the magnetic layer is proportionately small, the disadvantage tends to ensue that the magnetic layer will be deficient in durability, for example. If the content is unduly small, high regenerating output will not be obtained any longer.

The magnetic powders enumerated above may be used either singly or in the form of a mixture of two or more members (such as, for example, the combination of Ba-ferrite with a metal magnetic powder).

As the binder to be contained in the magnetic layer 10, any of known binder resins such as, for example, thermoplastic resins, reactive resins, and electron beam curing resins.

Properly, the thermoplastic resin has a softening point of not higher than 150° C. and an average molecular weight in the approximate range of 5000–200000. As concrete examples of the thermoplastic resin, vinyl chloride type copolymers, polyurethane resin, (meth)acrylic resins, polyester resins, nitrocellulose, and phenoxy type resins may be cited.

In all these resins, the combination of a vinyl chloride type copolymer as a thermoplastic resin with a polyurethane resin is used most advantageously. Preferably, this resin uses at least one polar group selected from among functional groups which possess hydrophilicity as polar groups. These polar groups may be present in a main chain or in a branch of the skeleton resin.

The vinyl chloride type copolymer and the polyurethane resin are appropriately used as mixed in amounts calculated to form a weight ratio in the range of 10:90–90:10. The polyurethane resin, when containing at least two species having different glass transition points, Tg, within the range of $-20° C. \leq Tg \leq 80° C.$, proves advantageous in respect that this combination balances the running stability, calendering property, and electromagnetic conversion property in the environment of high temperature.

As the cross-linking agent for curing the binder resin, various polyisocyanates and isocyanurate type cross-linking agents are properly used. Further, the practice of introducing a (meth)acryloyl type double bond into the copolymer mentioned above thereby rendering the double bond sensitive to electron beam forms a preferred mode of curing the binder resin. These resins are appropriately used as suitably combined to satisfy the quality which the magnetic layer 10 is expected to assume.

The magnetic layer 10 generally contains a lubricating agent. This invention particularly prefers this lubricating agent to be a fatty acid and/or a fatty acid ester among various sorts of known lubricating agents. These lubricating agents, when necessary, may be used in the form of a mixture of two or more members. Preferably, the lubricating agent is contained in the backcoat layer 20 or in an undercoating layer which is optionally provided for the magnetic recording medium, besides the magnetic layer. Particularly when the magnetic layer is thin, the incorporation of the lubricating agent in the undercoat layer is effective in improving the still durability. Further, by allowing the backcoat layer 20 to contain the lubricating agent in a larger amount, the transfer of the lubricating agent to the surface of the magnetic layer 10 can be relied on to improve the lubricity of the surface.

The magnetic layer 10 is allowed to contain a pigment. As concrete examples of the pigment which is usable herein, α-alumina, γ-alumina, θ-alumina, dichromium trioxide, α-iron oxide, $SiO_2$, ZnO, $TiO_2$, silicon carbide, calcium carbonate, barium sulfate, and varying species of carbon black (such as furnace carbon black, thermal carbon black, and acetylene black) may be cited. These pigments are used either singly or in the form of a mixture of two or more members. Such a pigment is generally used in an amount in the range of 0.1–20% by weight, based on the amount of the metal magnetic powder.

A paint for forming the magnetic layer 10 contains a solvent. The solvents which are usable herein include ketones such as methylethyl ketone, methyl sobutyl ketone, and cyclohexanone; aromatic hydrocarbons such as toluene and xylene; esters such as ethyl acetate and butyl acetate; and diluents or solvents such as dioxane, tetrahydrofuran, dimethyl formamide, and hexanes, for example. These solvents are used either singly or in the form of a mixture consisting of two or more members at an arbitrary ratio.

A paint for forming the backcoat layer 20 contains a binder and a solvent. The binder and the solvent may be properly selected from among the binders and the solvents cited by way of example in the preceding description regarding the magnetic layer. The backcoat layer 20 has a thickness in the range of 0.2–1.5 μm, preferably 0.3–1.0 μm.

When the undercoat layer is formed beneath the magnetic layer 10 for the purpose of improving such properties as, for example, surface property, adhesiveness, and durability, the component materials for the undercoat layer can be properly selected from among those binders, solvents, lubricating agents, and pigments cited above by way of example in the description concerning the magnetic layer. On the magnetic layer 10, such protective lubricating layers as are formed of a lubricating agent, a plasma polymer film, and a diamond-like film may be superposed for the purpose of lubricating and protecting the magnetic layer 10.

The magnetic recording medium of this invention obtained as a finished product has a thickness in the approximate range of 4.0–10.0 μm, preferably 5.0–8.0 μm.

Prior to the application of the magnetic layer 10 and the backcoat layer 20 of the magnetic recording medium of the present invention, the process for manufacturing the paint for the formation of the magnetic layer 10 and the paint for the formation of the backcoat layer 20 comprises at least a kneading step, a dispersing step, and a mixing step which is performed, when necessary, before or after either of the two steps mentioned above. At the kneading step, the pigment powder and the whole or part of the binder are kneaded by the use of a device such as, for example, a continuous kneader, a pressure kneader, a high speed mixer, or a twin-roll mill which has strong kneading power. At the step for dispersing the coating material, zirconia or glass beads are used as a medium for the dispersion of the paint. At this dispersing step, the paint is dispersed in such a manner that the concentration of solids will gradually decrease. The paint which results from the dispersion, when necessary, is made to add a hardening agent and then, at a filtering step, passed through a filter of prescribed operating accuracy to obtain a finished paint fit for application.

The paint thus produced is applied by a varying coating means such as, for example, a nozzle coater, a gravure coater, a reverse roll coater, or an extrusion nozzle coater onto an elongate filmy nonmagnetic support 2 paid out from a winding roll. The nonmagnetic support 2 in this case manifests such physical properties as Young's moduluses in the longitudinal and the lateral direction respectively, in the range of 1300–1600 kg/cm$^2$ and a breaking elongation in the range of 3–10%. This nonmagnetic support 2 is furnished on the magnetic layer side thereof with a convex cupping the magnitude of which is in the range of 0.05–0.25 mm at a width of 3.8 mm. For the running in the line, the nonmagnetic support 2 must be so set that the magnetic layer forming (or applying) side (the side on which the magnetic coating material is applied) may form a convex cupping.

The nonmagnetic support 2 prior to application is generally given a cleaning treatment of a wet, dry, or noncontact method. Further, a treatment by corona discharge, a treatment by exposure to ultraviolet light, or a treatment by exposure to electron beam is performed, when necessary, on the cleaned nonmagnetic support 2 for the purpose of improving the fastness of adhesion of the paint to the nonmagnetic support or improving the surface of coating. Incidentally, the undercoating agent or the undercoat layer (undercoating layer) having a nonmagnetic pigment dispersed in resin may be applied either simultaneously with or independently of the surface treatment mentioned above.

The magnetic layer 10 may consist of a single layer or a plurality (two or more) of layers. Properly, the magnetic layer is formed by the so-called wet-on-dry method or wet-on-wet method.

Subsequently to this coating step, the surface of the applied magnetic layer is smoothed and the applied magnetic layer is exposed to a magnetic field to orient the magnetic particles in the layer and then dried and fixed at a temperature in the approximate range of 50–200° C.

This drying step is followed by a calendering treatment for smoothing the surface of the magnetic layer. The rolls to be used for the calendering treatment may be combinations (three to seven steps) of a heat-resistant plastic roll of epoxy, polyester, nylon, polyimide, polyamide, or polyimideamide (optionally incorporating therein carbon, metal, or other organic compound) with a metallic roll or pairs of metallic rolls. Properly, the temperature of this calendering treatment is not lower than 70° C., preferably not lower than 80° C., the linear pressure thereof is not less than 200 kg/cm, preferably not less than 300 kg/cm, and the speed thereof is in the range of 20 m/minute–700 m/minute. Then, on the surface 2b of the nonmagnetic support 2 opposite the surface of the magnetic layer 10 formed as described above, the paint for the formation of the backcoat layer is applied by a varying coating means such as, for example, a nozzle coater, a gravure coater, a reverse roll coater, or an extrusion nozzle coater. The applied layer of the paint is subsequently dried and fixed at a temperature in the approximate range of 50–200° C. Thereafter, it is subjected to the same calendering treatment as the magnetic layer 10 mentioned above for the sake of smoothing the surface.

Appropriately, the application of the paint for the formation of the backcoat layer is performed after the magnetic layer 10 has been applied, dried, and calendered. If the backcoat layer 20 is formed in advance of the magnetic layer 10, the magnetic layer 10 tends to have the surface roughness thereof impaired during the course of surface treatment thereof.

After the two layers (the magnetic layer 10 and the backcoat layer 20) have both undergone the calendering treatment as described above, the elongate composite strip is taken up in a roll and in this state of rolling up, subjected to a thermosetting treatment at a temperature in the range of 40° C.–80° C. and/or a treatment by exposure to an electron beam for promoting hardness. Thereafter, the roll is cut in a prescribed shape and further subjected to a secondary fabrication to complete the magnetic recording medium.

Generally, the cupping in the magnetic recording medium is such that the convex cupping tends to grow on the applied layer side when the paint being formulated has a high packing ratio. Further, It is susceptible of the influences of the sequence of formation of the applied layers and the drying conditions. The concave cupping grows on the applied layer side in proportion as the drying temperature rises, the amount of drying air increases, and the drying speed heightens. The change of the cupping by aging widens in proportion as the insufficiency of drying grows. These influences are particularly aggravated in accordance as the thickness of the nonmagnetic support is decreased. The support in this invention must be only sparingly susceptible of the influences of the factors mentioned above during the formation of applied layers and must be capable of preserving adequate cupping in spite of changes by aging.

The magnetic recording medium of this invention produced as described above is so constructed as is furnished on the magnetic layer side thereof with a convex cupping the magnitude of which is in the range of 0.02–0.20 mm at a width of 3.8 mm as mentioned above. The magnetic recording medium of this invention is used in a rotary head type recording system. The expression "rotary head type recording system" means a system of the type adapted for both recording and regenerating operations. This system, for the purpose of increasing the speed of a tape, i.e. a medium for effecting recording and regenerating operations, relative to a tape head, utilizes a rotary head for producing a slightly inclined recording track in the longitudinal direction of the tape.

(Embodiments)

Now, this invention will be described more specifically below with reference to concrete working examples.

First, polyparaphenylene terephthalamide (PPTA) as the basic raw material for the nonmagnetic support was prepared.

Production of polyparaphenylene terephthalamide (PPTA)

In 1000 parts by weight of N-methyl pyrrolidone, 70 parts by weight of anhydrous lithium chloride was dissolved and then 48.6 parts of paraphenylene diamine was dissolved.

The solution was cooled to 8° C. and then 91.4 parts by weight of terephthalic acid dichloride was added in a powdered form thereto. The product of polymerization reaction which set like cheese in several minutes was extracted from the polymerization device, transferred immediately to a twin-axis tightly closed kneader, and finely pulverized therein. Then, the fine powder was transferred into a Henschel mixer, mixed with a substantially equal amount of water, further pulverized finely therein, filtered, washed several times in hot water, and thereafter dried in a current of hot air at 110° C. to obtain a light yellow PPTA polymer having an intrinsic viscosity of 5.5.

Various samples of nonmagnetic support indicated herein below (referred to simply as "support" hereinafter) were prepared with the PPTA polymer.

(Support A)

The PPTA polymer manifesting an intrinsic viscosity of 5.8 and having colloidal silica, 0.2 μm in particle diameter, added preparatorily thereto in an amount of 0.2 wt % was dissolved in 99.7% sulfuric acid in an amount calculated to yield a polymer concentration of 13% and produce an optically anisotropic dope. This dope was kept at about 70° C., cast from a die onto a mirror-polished belt of tantalum, further blown with air of about 90° C. and 80% of relative humidity to impart optical isotropy to the cast dope, and solidified by being placed together with the belt in a dilute sulfuric acid bath at about 5° C. to effect continuous manufacture of a film. The solidified film was cleaned by being-run through water at room temperature, then an aqueous 0.1% NaOH solution, and further a hot water at 50° C. The film, after completely undergoing the cleaning treatment and still remaining in an undried state, was orientated (or elongated) with a tenter in both the longitudinal and the lateral direction to 1.35 times the original size, respectively, then dried at a constant length at 130° C., and subsequently heat-treated with another tenter at a constant length at 300° C. to manufacture a support A having a thickness of 4.5 μm and manifesting a Young's modulus of 1580 kg/cm² and a breaking elongation of 3%. This support A had a cupping of 0.12 mm. The Young's modulus and the breaking elongation were determined as follows. The cupping will be described more specifically afterward.

Young's modulus

A sample, cut to 3.8 mm in width and 150 mm in length, was subjected to a tensile test using an instrument produced by Orienteck K. K. and marketed under product code of RTM-100," with a chuck interval set at 100 mm and a tensile speed at 20 m/min. The Young's modulus was calculated from the tangent at the initial part of the load-elongation curve obtained in the test.

Breaking elongation

A sample, cut to 3.8 mm in width and 150 mm in length, was subjected to a tensile test using an instrument produced by Orienteck K. K. and marketed under product code of RTM-100," with a chuck interval set at 100 mm and a tensile speed at 20 m/min. The breaking elongation was calculated from the elongation at the break point in the load-elongation curve obtained in the test.

(Support B)

The PPTA polymer manifesting an intrinsic viscosity of 5.8 and having colloidal silica, 0.2 μm in particle diameter, added preparatorily thereto in an amount of 0.2 wt % was dissolved in 99.7% sulfuric acid in an amount calculated to yield a polymer concentration of 13% and produce an optically anisotropic dope. This dope was kept at about 70° C., cast from a die onto a mirror-polished belt of tantalum, further blown with air of about 90° C. and 80% of relative humidity to impart optical isotropy to the cast dope, and solidified by being placed together with the belt in a dilute sulfuric acid bath at about 5° C. to effect continuous manufacture of a film. The solidified film was cleaned by being run through water at room temperature, then an aqueous 0.1% NaOH solution, and further a hot water at 50° C. The film, after completely undergoing the cleaning treatment and still remaining in an undried state, was orientated (or elongated) with a tenter in both the longitudinal and the lateral direction to 1.15 times the original size, respectively, then dried at a constant length at 130° C., and subsequently heat-treated with another tenter at a constant length at 300° C. to manufacture a support B having a thickness of 4.5 μm and manifesting a Young's modulus of 1350 kg/cm² and a breaking elongation of 9%. This support B had a cupping of 0.12 mm.

(Support C)

The PPTA polymer manifesting an intrinsic viscosity of 5.8 and having colloidal silica, 0.2 μm in particle diameter, added preparatorily thereto in an amount of 0.2 wt % was dissolved in 99.7% sulfuric acid in an amount calculated to yield a polymer concentration of 13% and produce an optically anisotropic dope. This dope was kept at about 70° C., cast from a die onto a mirror-polished belt of tantalum, further blown with air of about 90° C. and 80% of relative humidity to impart optical isotropy to the cast dope, and solidified by being placed together with the belt in a dilute sulfuric acid bath at about 5° C. to effect continuous manufacture of a film. The solidified film was cleaned by being run through water at room temperature, then an aqueous 0.1% NaOH solution, and further a hot water at 50° C. The film, after completely undergoing the cleaning treatment and still remaining in an undried state, was orientated (or elongated) with a tenter in both the longitudinal and the lateral direction to 1.20 times the original size, respectively, then dried at a constant length at 130° C., and subsequently heat-treated with another tenter at a constant length at 300° C. to manufacture a support C having a thickness of 4.5 μm and manifesting a Young's modulus of 1400 kg/cm² and a breaking elongation of 8%. This support C had a cupping of 0.12 mm.

(Support D)

The PPTA polymer manifesting an intrinsic viscosity of 5.8 and having colloidal silica, 0.2 μm in particle diameter, added preparatorily thereto in an amount of 0.2 wt % was dissolved in 99.7% sulfuric acid in an amount calculated to yield a polymer concentration of 13% and produce an optically anisotropic dope. This dope was kept at about 70° C., cast from a die onto a mirror-polished belt of tantalum, further blown with air of about 90° C. and 80% of relative humidity to impart optical isotropy to the cast dope, and solidified by being placed together with the belt in a dilute sulfuric acid bath at about 5° C. to effect continuous manufacture of a film. The solidified film was cleaned by being run through water at room temperature, then an aqueous 0.1% NaOH solution, and further a hot water at 50° C. The film, after completely undergoing the cleaning treatment and still remaining in an undried state, was orientated (or elongated) with a tenter in both the longitudinal and the lateral direction to 1.20 times the original size, respectively, then dried at a constant length at 150° C., and subsequently heat-treated with another tenter at a constant length at 300° C. to manufacture a support D having a thickness of 4.5 µm and manifesting a Young's modulus of 1400 kg/cm² and a breaking elongation of 8%. This support D had a cupping of 0.25 mm.

(Support E)

The PPTA polymer manifesting an intrinsic viscosity of 5.8 and having colloidal silica, 0.2 µm in particle diameter, added preparatorily thereto in an amount of 0.2 wt % was dissolved in 99.7% sulfuric acid in an amount calculated to yield a polymer concentration of 13% and produce an optically anisotropic dope. This dope was kept at about 70° C., cast from a die onto a mirror-polished belt of tantalum, further blown with air of about 90° C. and 80% of relative humidity to impart optical isotropy to the cast dope, and solidified by being placed together with the belt in a dilute sulfuric acid bath at about 5° C. to effect continuous manufacture of a film. The solidified film was cleaned by being run through water at room temperature, then an aqueous 0.1% NaOH solution, and further a hot water at 50° C. The film, after completely undergoing the cleaning treatment and still remaining in an undried state, was orientated (or elongated) with a tenter in both the longitudinal and the lateral direction to 1.20 times the original size, respectively, then dried at a constant length at 110° C., and subsequently heat-treated with another tenter at a constant length at 370° C. to manufacture a support E having a thickness of 4.5 µm and manifesting a Young's modulus of 1400 kg/cm² and a breaking elongation of 8%. This support E had a cupping of 0.05 mm.

(Support F)

The PPTA polymer manifesting an intrinsic viscosity of 5.8 and having colloidal silica, 0.2 µm in particle diameter, added preparatorily thereto in an amount of 0.2 wt % was dissolved in 99.7% sulfuric acid in an amount calculated to yield a polymer concentration of 13% and produce an optically anisotropic dope. This dope was kept at about 70° C., cast from a die onto a mirror-polished belt of tantalum, further blown with air of about 90° C. and 80% of relative humidity to impart optical isotropy to the cast dope, and solidified by being placed together with the belt in a dilute sulfuric acid bath at about 5° C. to effect continuous manufacture of a film. The solidified film was cleaned by being run through water at room temperature, then an aqueous 0.1% NaOH solution, and further a hot water at 50° C. The film, after completely undergoing the cleaning treatment and still remaining in an undried state, was orientated (or elongated) with a tenter in both the longitudinal and the lateral direction to 1.10 times the original size, respectively, then dried at a constant length at 110° C., and subsequently heat-treated with another tenter at a constant length at 300° C. to manufacture a support F having a thickness of 4.5 µm and manifesting a Young's modulus of 1300 kg/cm² and a breaking elongation of 10%. This support F had a cupping of 0.12 mm.

(Support G)

The PPTA polymer manifesting an intrinsic viscosity of 5.8 and having colloidal silica, 0.2 µm in particle diameter, added preparatorily thereto in an amount of 0.2 wt % was dissolved in 99.7% sulfuric acid in an amount calculated to yield a polymer concentration of 13% and produce an optically anisotropic dope. This dope was kept at about 70° C., cast from a die onto a mirror-polished belt of tantalum, further blown with air of about 90° C. and 80% of relative humidity to impart optical isotropy to the cast dope, and solidified by being placed together with the belt in a dilute sulfuric acid bath at about 5° C. to effect continuous manufacture of a film. The solidified film was cleaned by being run through water at room temperature, then an aqueous 0.1% NaOH solution, and further a hot water at 50° C. The film, after completely undergoing the cleaning treatment and still remaining in an undried state, was orientated (or elongated) with a tenter in both the longitudinal and the lateral direction to 1.10 times the original size, respectively, then dried at a constant length at 130° C., and subsequently heat-treated with another tenter at a constant length at 370° C. to manufacture a support G having a thickness of 3.8 µm and manifesting a Young's modulus of 1300 kg/cm² and a breaking elongation of 10%. This support G had a cupping of 0.13 mm.

(Support H)

The PPTA polymer manifesting an intrinsic viscosity of 5.8 and having colloidal silica, 0.2 µm in particle diameter, added preparatorily thereto in an amount of 0.2 wt % was dissolved in 99.7% sulfuric acid in an amount calculated to yield a polymer concentration of 13% and produce an optically anisotropic dope. This dope was kept at about 70° C., cast from a die onto a mirror-polished belt of tantalum, further blown with air of about 90° C. and 80% of relative humidity to impart optical isotropy to the cast dope, and solidified by being placed together with the belt in a dilute sulfuric acid bath at about 5° C. to effect continuous manufacture of a film. The solidified film was cleaned by being run through water at room temperature, then an aqueous 0.1% NaOH solution, and further a hot water at 50° C. The film, after completely undergoing the cleaning treatment and still remaining in an undried state, was orientated (or elongated) with a tenter in both the longitudinal and the lateral direction to 1.10 times the original size, respectively, then dried at a constant length at 130° C., and subsequently heat-treated with another tenter at a constant length at 300° C. to manufacture a support H having a thickness of 6.5 µm and manifesting a Young's modulus of 1300 kg/cm² and a breaking elongation of 10%. This support H had a cupping of 0.13 mm.

(Support P)

The PPTA polymer manifesting an intrinsic viscosity of 5.8 and having colloidal silica, 0.2 µm in particle diameter, added preparatorily thereto in an amount of 0.2 wt % was dissolved in 99.7% sulfuric acid in an amount calculated to yield a polymer concentration of 13% and produce an optically anisotropic dope. This dope was kept at about 70° C., cast from a die onto a mirror-polished belt of tantalum, further blown with air of about 90° C. and 80% of relative humidity to impart optical isotropy to the cast dope, and solidified by being placed together with the belt in a dilute sulfuric acid bath at about 5° C. to effect continuous manufacture of a film. The solidified film was cleaned by being run through water at room temperature, then an aqueous 0.1% NaOH solution, and further a hot water at 50° C. The film, after completely undergoing the cleaning treatment and still remaining in an undried state, was orientated (or elongated) with a tenter in both the longitudinal and the lateral direction to 1.40 times the original size, respectively, then dried at a constant length at 130° C., and subsequently heat-treated with another tenter at a constant length at 300° C. to manufacture a support P having a thickness of 4.5 µm and manifesting a Young's modulus of 1650 kg/cm² and a breaking elongation of 2%. This support P had a cupping of 0.12 mm.

(Support Q)

The PPTA polymer-manifesting an intrinsic viscosity of 5.8 and having colloidal silica, 0.2 μm in particle diameter, added preparatorily thereto in an amount of 0.2 wt % was dissolved in 99.7% sulfuric acid in an amount calculated to yield a polymer concentration of 13% and produce an optically anisotropic dope. This dope was kept at about 70° C., cast from a die onto a mirror-polished belt of tantalum, further blown with air of about 90° C. and 80% of relative humidity to impart optical isotropy to the cast dope, and solidified by being placed together with the belt in a dilute sulfuric acid bath at about 5° C. to effect continuous manufacture of a film. The solidified film was cleaned by being run through water at room temperature, then an aqueous 0.1% NaOH solution, and further a hot water at 50° C. The film, after completely undergoing the cleaning treatment and still remaining in an undried state, was orientated (or elongated) with a tenter in both the longitudinal and the lateral direction to 1.20 times the original size, respectively, then dried at a constant length at 180° C., and subsequently heat-treated with another tenter at a constant length at 300° C. to manufacture a support Q having a thickness of 4.5 μm and manifesting a Young's modulus of 1400 kg/cm² and a breaking elongation of 8%. This support Q had a cupping of 0.28 mm.

(Support R)

The PPTA polymer manifesting an intrinsic viscosity of 5.8 and having colloidal silica, 0.2 μm in particle diameter, added preparatorily thereto in an amount of 0.2 wt % was dissolved in 99.7% sulfuric acid in an amount calculated to yield a polymer concentration of 13% and produce an optically anisotropic dope. This dope was kept at about 70° C., cast from a die onto a mirror-polished belt of tantalum, further blown with air of about 90° C. and 80% of relative humidity to impart optical isotropy to the cast dope, and solidified by being placed together with the belt in a dilute sulfuric acid bath at about 5° C. to effect continuous manufacture of a film. The solidified film was cleaned by being run through water at room temperature, then an aqueous 0.1% NaOH solution, and further a hot water at 50° C. The film, after completely undergoing the cleaning treatment and still remaining in an undried state, was orientated (or elongated) with a tenter in both the longitudinal and the lateral direction to 1.20 times the original size, respectively, then dried at a constant length at 110° C., and subsequently heat-treated with another tenter at a constant length at 400° C. to manufacture a support R having a thickness of 4.5 μm and manifesting a Young's modulus of 1400 kg/cm² and a breaking elongation of 8%. This support R had a cupping of 0.00 mm.

(Support S)

The PPTA polymer manifesting an intrinsic viscosity of 5.8 and having colloidal silica, 0.2 μm in particle diameter, added preparatorily thereto in an amount of 0.2 wt % was dissolved in 99.7% sulfuric acid in an amount calculated to yield a polymer concentration of 13% and produce an optically anisotropic dope. This dope was kept at about 70° C., cast from a die onto a mirror-polished belt of tantalum, further blown with air of about 90° C. and 80% of relative humidity to impart optical isotropy to the cast dope, and solidified by being placed together with the belt in a dilute sulfuric acid bath at about 5° C. to effect continuous manufacture of a film. The solidified film was cleaned by being run through water at room temperature, then an aqueous 0.1% NaOH solution, and further a hot water at 50° C. The film, after completely undergoing the cleaning treatment and still remaining in an undried state, was orientated (or elongated) with a tenter in both the longitudinal and the lateral direction to 1.05 times the original size, respectively, then dried at a constant length at 130° C., and subsequently heat-treated with another tenter at a constant length at 300° C. to manufacture a support S having a thickness of 4.5 μm and manifesting a Young's modulus of 1200 kg/cm² and a breaking elongation of 12%. This support S had a cupping of 0.12 mm.

(EXAMPLE 1)

A magnetic paint for the formation of a magnetic layer and a paint for the formation of a backcoat layer were prepared as follows.

First, the magnetic paint for the formation of the magnetic layer was prepared by using the following composition containing a ferromagnetic metal powder (Fe/Co/Al/Nd = 100/15/3.5/5) having Hc = 1650 Oe, $\sigma_s$=135 emu/g, BET = 60 m²/g, average length of major axis = 0.13 μm, and average axis ratio = 5.

Magnetic paint composition for formation of magnetic layer

| | |
|---|---|
| · Ferromagnetic metal powder | 100 parts by weight |
| · Vinyl chloride copolymer (having polymerization degree of 300 and containing a polar group - SO₃K; produced by Nippon Zeon K.K., marketed under product code of "MR-110") | 8 parts by weight |
| · Polyurethane resin (containing Na sulfonate; produced by Toyo Boseki K.K., marketed under product code of "UR-8700") | 8 parts by weight |
| · α-Al₂O₃ (HIT-60A, having average particle diameter of 0.2 μm) | 10 parts by weight |
| · Stearic acid | 1 part by weight |
| · Butyl stearate | 1 part by weight |
| · Methylethyl ketone | 125 parts by weight |
| · Toluene | 95 parts by weight |
| · Cyclohexane | 95 parts by weight |

The composition was thoroughly kneaded with a kneader and then dispersed with a sand grind mill. The magnetic paint thus obtained was mixed with 3 parts by weight of a hardener (produced by Nippon Poriuretan Kogyo K. K. and marketed under trademark designation of "Coronate L") and the resultant mixture was passed through a filter having an average pore diameter of 0.3 μm to manufacture the paint for the formation of the magnetic layer.

Then, the paint for the formation of the backcoat layer was prepared by using the following paint composition for the formation of a backcoat layer.

Paint composition for formation of backcoat layer

| | |
|---|---|
| · Carbon black (having average particle diameter 17 nm and BET = 210 m²/g; produced by Cabotto-sha and marketed under product code of "BP-800") | 100 parts by weight |
| · Nitrocellulose (produced by Asahi Kasei Kogyo K.K.; BTH 1/2) | 80 parts by weight |
| · Polyurethane resin (containing Na sulfonate; produced by Toyo Boseki K.K. and marketed under product code of "UR-8700") | 40 parts by weight |

| · Methylethyl ketone | 540 parts by weight |
| · Toluene | 520 parts by weight |
| · Cyclohexanone | 550 parts by weight |

This composition was thoroughly kneaded with a kneader and dispersed with a sand grind mill. The paint thus obtained was mixed with 2 parts by weight of a hardener (produced by Nippon Poriuretan Kogyo K. K. and marketed under trademark designation of "Coronate L") and the resultant mixture was passed through a filter having an average pore diameter of 0.5 µm to manufacture the paint for the formation of the backcoat layer.

Samples of the magnetic recording medium were manufactured by the following procedure using the paint for the formation of the magnetic layer and the paint for the formation of the backcoat layer.

First, the paint for the formation of the magnetic layer was applied so much on the support A as to form a layer, 1.5 µm in thickness, and the applied layer was exposed to an orienting magnetic field of 7000 gausses and then dried. Then, the layer was subjected to a calendering treatment at a temperature of 110° C. under a linear pressure of 300 kg/cm, and under the condition of three nips. On the surface of the support opposite the surface bearing the magnetic layer formed as described above, the paint for the formation of the backcoat layer was applied in a thickness of 0.5 µm. Then, the applied layer was dried. This layer was subjected to a calendering treatment at 100° C. under a linear pressure of 230 kg/cm, and under the condition of three nips. The film of magnetic recording medium which had undergone the series of treatments mentioned above was taken up on a winding roll. The roll was left standing at rest for 24 hours and then subjected to a thermosetting treatment at 60° C. for 24 hours.

The film of magnetic recording medium thus manufactured was cut with a slitter in a width of 3.8 mm to obtain Sample 1 of magnetic recording medium in this example.

(EXAMPLE 2)

Sample 2 of magnetic recording medium in this example was manufactured by following the procedure of Example 1 while using the support B in the place of the support A.

(EXAMPLE 3)

Sample 3 of magnetic recording medium in this example was manufactured by following the procedure of Example 1 while using the support C in the place of the support A.

(EXAMPLE 4)

Sample 4 of magnetic recording medium in this example was manufactured by following the procedure of Example 1 while using the support D in the place of the support A.

(EXAMPLE 5)

Sample 5 of magnetic recording medium in this example was manufactured by following the procedure of Example 1 while using the support E in the place of the support A.

(EXAMPLE 6)

Sample 6 of magnetic recording medium in this example was manufactured by following the procedure of Example 1 while using the support F in the place of the support A.

(EXAMPLE 7)

Sample 7 of magnetic recording medium in this example was manufactured by following the procedure of Example 1 while using the support G in the place of the support A.

(EXAMPLE 8)

Sample 8 of magnetic recording medium in this example was manufactured by following the procedure of Example 1 while using the support H in the place of the support A.

(Comparative Example 1)

Manufacture of a sample was tried by following the procedure of Example 1 while using the support P in the place of the support A. The manufacture of the sample of magnetic recording medium itself, however, failed because the support P frequently sustained breakage in the production line for the magnetic recording medium.

(Comparative Example 2)

Comparative sample 2 of magnetic recording medium in this comparative example was manufactured by following the procedure of Example 1 while using the support Q in the place of the support A.

(Comparative Example 3)

Comparative sample 3 of magnetic recording medium in this comparative example was manufactured by following the procedure of Example 1 while using the support R in the place of the support A.

(Comparative Example 4)

Comparative sample 4 of magnetic recording medium in this comparative example was manufactured by following the procedure of Example 1 while using the support S in the place of the support A.

The samples 1–8 of the working examples and the comparative samples 2–4 of the comparative Examples manufactured as described above were rated for (1) cupping value, (2) dropout, and (3) head stain as follows.

(1) Cupping value (before and after storage)

Samples for the determination of cupping value were obtained by cutting a length, 5 cm, from a given (nonmagnetic) support cut in a width of 3.8 mm and from a given magnetic recording medium cut in a width of 3.8 mm, respectively. First, these samples were set in a free state (as gently placed on a board, with the convexly cupped surface on the upper side) and measured for tape width at five points with an instrument (marketed under trademark designation of "Nikon Measurescope"). Let $L_0$ (mm) stand for the average of the five measurements. Then, the samples were nipped between sample holders so as to be deprived of the cupping and was measured for tape width at five points with the same instrument. Let $L_1$ (mm) stand for the average of the five measurements. At this time, the cupping, h, was calculated by the following formula. The convex on the magnetic layer side was taken as minus (−) and the concave as plus (+).

$$h(mm) = (L_1 / 2 \theta)(1 - \cos \theta)$$

In this formula, θ[rad] stands for the angle which is one half of the central angle resulting from approximating the cross section of the sample taken in the direction of width by the arc and which satisfies the following formula.

$$\theta / \sin \theta = L_1 / L_0$$

The cupping of the samples after storage were determined by obtaining the samples, 120 m in length, from a given magnetic recording medium, winding the sample in a roll, setting the roll in a cartridge designed exclusively for holding a medium, storing the cartridge in an environment of 50° C. and 80% RH for five days, then allowing the cartridge to stand at rest at room temperature for 24 hours, and subjecting the sample to the aforementioned procedure.

(2) Dropout (before and after storage)

The dropout of a given magnetic recording medium was determined by obtaining a sample, 125 m in length, setting this sample in a cartridge designed exclusively for a medium, and running the sample with a 4-mm tape drive under the following conditions. The number of spots of dropout found per 20,000 tracks was reported as the numerical value of dropout.

Tape speed:8.15 mm/sec

Relative speed of tape/head:3.133 m/sec

Read track width:20±2 μm

Write gap length:0.25±0.3μm

Recording density:2.33 MHz (1501 ftpmm)

Definition of dropout: A base-to-peak amplitude of a regenerated signal which is not more than 50% of one half of the average amplitude of regenerated signal of a given tape is reckoned as a defect bit. When one defect bit is detected, it is counted as a first dropout. The next dropout is not counted until five continual reversions of defectless magnetic flux have been read in. If a dropout continues over a length of 0.120 mm, the next dropout will be counted. Any one dropout is not carried over to the next track. The dropout after the storage is determined by taking a sample, 120 μm in length, from a given magnetic recording medium, winding this sample in a roll, setting the rolled sample in a cartridge designed exclusively for holding a medium, storing the cartridge in an environment of 50° C. and 80% RH for five days, and allowing it to stand at rest at room temperature for 24 hours.

(3) Head stain (before and after storage)

Sample rolls were prepared by cutting lengths, 125 m each, from a given magnetic recording medium cut in a width of 3.8 mm, winding the lengths each in a roll, and setting the rolls each in a cartridge designed exclusively for holding a medium. The first sample roll was set on a DAT (digital audio tape) deck and run in the recording mode throughout the entire length thereof. The head stained by this recording run of the first sample roll was observed under an optical microscope. With the head left uncleaned, the second sample roll was run in the recording mode throughout the entire length thereof. This procedure was repeated until the sixth sample roll. Thereafter, the head was visually examined to determine the degree of defilement with stain.

The head stain after storage was determined by storing a sample roll in an environment of 50° C. and 80% RH for five days, then allowing the sample roll to stand at rest at room temperature for 24 hours, and visually observing it by following the procedure described above.

The head strain was rated on the following four-point scale.

○ . . . Absence of head stain

△ . . . Presence of partial stain at the shoulder part of head.

▲ . . . Presence of stain beyond the shoulder part of head.

χ . . . Presence of stain throughout the entire surface of head.

The results are shown in Table 1 below.

TABLE 1

| | Nonmagnetic support | | | Magnetic recording medium | | | | | |
|---|---|---|---|---|---|---|---|---|---|
| | Young's modulus | Breaking | | Cupping (mm) | | Dropout | | Head stain | |
| Sample No. | longitudinal/ lateral (kg/cm$^2$) | elongation (%) | Cupping (mm) | Initial | After storage | Initial | After storage | Initial | After storage |
| Example 1 | 1580/1580 | 3 | −0.12 | −0.10 | −0.07 | 350 | 550 | 6 rolls ○ | 6 rolls ○ |
| Example 2 | 1350/1350 | 9 | −0.12 | −0.09 | −0.07 | 380 | 540 | 6 rolls ○ | 6 rolls ○ |
| Example 3 | 1400/1400 | 8 | −0.12 | −0.09 | −0.07 | 410 | 590 | 6 rolls ○ | 6 rolls ○ |
| Example 4 | 1400/1400 | 8 | −0.25 | −0.20 | −0.14 | 420 | 610 | 6 rolls ○ | 6 rolls ○ |
| Example 5 | 1400/1400 | 8 | −0.05 | −0.03 | −0.02 | 370 | 500 | 6 rolls ○ | 6 rolls ○ |
| Example 6 | 1300/1300 | 10 | −0.12 | −0.05 | −0.03 | 380 | 550 | 6 rolls ○ | 6 rolls ○ |
| Example 7 | 1400/1400 | 8 | −0.12 | −0.07 | −0.03 | 450 | 660 | 6 rolls ○ | 6 rolls ○ |
| Example 8 | 1400/1400 | 8 | −0.12 | −0.11 | −0.10 | 480 | 520 | 6 rolls ○ | 6 rolls ○ |
| Compara. 1 | 1650/1650 | 2 | −0.12 | Breakage of support frequently occur in production line | | | | | |
| Compara. 2 | 1400/1400 | 8 | −0.28 | −0.23 | −0.21 | 1260 | 1580 | 6 rolls ○ | 6 rolls ○ |
| Compara. 3 | 1400/1400 | 8 | 0.00 | +0.05 | +0.08 | 2600 | 6600 | 5 rolls ▲ | 3 rolls x |
| Compara. 4 | 1200/1200 | 12 | −0.12 | −0.03 | +0.01 | 3000 | 6500 | 6 rolls △ | 3 rolls x |

In the table, the entry "6 rolls ○" represents that the test was performed until the sixth sample roll and that all the sample rolls were rated as "○".
Compara.: Comparative Example From the results shown in Table 1, it is clearly noted that in the samples of Examples 1–8, the nonmagnetic supports formed cuppings, 0.05–0.25 mm, at a width of 3.8 mm convexly on the side of applying the magnetic layer and manifested Young's moduluses, 1300–1600 kg/cm$^2$, in both the longitudinal and the lateral direction, respectively, and breaking elongations, 3–10%. Even after the magnetic layer and the backcoat layer were formed thereon, the samples maintained the cuppings, 0.02–0.20 mm, at a width of 3.8 mm convexly on the magnetic layer side. Thus, they realized perfect head touch and cutting property and proved satisfactory in terms of dropout and head stain.

When the nonmagnetic support had a high Young's modulus and a small breaking elongation as in the sample roll of Comparative Example 1, the nonmagnetic support itself readily sustained breakage in the production line of a magnetic recording medium and the production of the magnetic recording medium was difficult.

When the nonmagnetic support formed an unduly large convex cupping on the magnetic layer side as in the sample roll of Comparative Example 2, the magnetic recording medium formed so large a large convex cupping on the magnetic layer side as to impair head touch and aggravate dropout. Conversely when the nonmagnetic support showed absolutely no cupping as in the sample roll of Comparative Example 3, it formed a concave cupping on the magnetic layer side after the magnetic layer and the backcoat layer were formed thereon, with the result that head touch was impaired and dropout and head stain were aggravated.

In the sample roll of Comparative Example 4, the magnetic recording medium showed inferior head touch because the nonmagnetic support had a low Young's modulus. Further, since the breaking elongation was large, the cutting property was degraded and dropout and head stain were aggravated.

The effect of this invention is evident from the results shown above. Specifically, this invention allows production of a magnetic recording medium which realizes perfect head touch and excels in cutting property and, therefore, suffers dropout and head stain only sparingly, and features high reliability because this invention defines the cupping, Young's modulus, and breaking elongation of the nonmagnetic support itself of the magnetic recording medium and, after the formation of the magnetic layer and the backcoat layer thereon, defines the cupping of the nonmagnetic support as well.

What is claimed is:

1. A magnetic recording medium comprising a nonmagnetic support, a magnetic layer provided on one surface of the nonmagnetic support and a backcoat layer provided on the other surface of the nonmagnetic support, said nonmagnetic support being provided with such physical properties as Young's moduluses in the longitudinal direction and the lateral direction thereof in the range of 1300–1600 kg/cm$^2$, respectively, and a breaking elongation in the range of 3–10% and said magnetic recording medium being provided on the magnetic layer side thereof with a convex cupping the magnitude of which is in the range of 0.02–0.20 mm at a width of 3.8 mm.

2. A magnetic recording medium according to claim 1, wherein said nonmagnetic support in a state prior to the formation of a magnetic layer and a backcoat layer thereon is provided on the side for the formation of said magnetic layer with a convex cupping the magnitude of which is in the range of 0.02–0.20 mm at a width of 3.8 mm.

3. A magnetic recording medium according to claim 1, wherein said nonmagnetic support has a thickness in the range of 3.5–7.0 µm and said magnetic recording medium has a thickness in the range of 4.0–10.0 µm.

4. A magnetic recording medium according to claim 1, wherein said nonmagnetic support is formed of an aromatic polyamide.

5. A magnetic recording medium according to claim 1, which is used for a rotary head type recording system.

* * * * *